United States Patent [19]
Melkild et al.

[11] Patent Number: 6,014,440
[45] Date of Patent: Jan. 11, 2000

[54] INTER-HALF CALL PROTOCOL NEGOTIATION TECHNIQUES

[75] Inventors: Keith W. Melkild; Mark L. Herbert, both of Allen; Brian M. Roeten, Garland, all of Tex.

[73] Assignee: Northern Telecom Limited, Montreal, Canada

[21] Appl. No.: 08/897,303

[22] Filed: Jul. 21, 1997

[51] Int. Cl.[7] .......................... H04M 3/00; H04M 11/00; H04J 3/02
[52] U.S. Cl. .......................... 379/269; 370/466; 370/467; 379/93.31; 395/183.15
[58] Field of Search .................................. 379/242, 258, 379/93.31, 289, 100.17, 93.29, 230, 201, 211, 212, 268, 269, 279; 395/183.13, 183.15; 370/466, 467

[56] References Cited

U.S. PATENT DOCUMENTS

| 5,420,916 | 5/1995 | Sekiguchi | 370/220 |
|---|---|---|---|
| 5,426,694 | 6/1995 | Hebert | 379/242 |
| 5,497,373 | 3/1996 | Hulen et al. | 370/79 |
| 5,546,453 | 8/1996 | Hebert | 379/242 |
| 5,640,446 | 6/1997 | Everett et al. | 379/115 |
| 5,706,286 | 1/1998 | Reiman et al. | 370/401 |
| 5,706,434 | 1/1998 | Kremen et al. | 395/200.09 |
| 5,740,230 | 4/1998 | Vaudreuil | 379/88 |
| 5,740,231 | 4/1998 | Cohn et al. | 379/89 |
| 5,740,374 | 4/1998 | Raffali-Schreinemachers | 395/200.68 |
| 5,778,189 | 7/1998 | Kimura et al. | 395/200.66 |
| 5,793,771 | 8/1998 | Darland et al. | 370/401 |
| 5,794,039 | 8/1998 | Guck | 395/683 |
| 5,848,415 | 12/1998 | Guck | 707/10 |
| 5,872,779 | 2/1999 | Vaudreuil | 370/352 |

OTHER PUBLICATIONS

P. Dhar, R. C. Ganguly, Subir Das, and D. Saha, "Network Interconnection and Protocol Conversion," IEEE Region 10 Conference, Tencon, Nov. 11–13, 1992, Melbourne Australia, p. 116–120.

Primary Examiner—Harry S. Hong
Attorney, Agent, or Firm—Haynes and Boone, LLP

[57] ABSTRACT

A method for protocol negotiation between an originating call handler and a terminating call handler, both of which reside within a switching node of a telecommunications network. A call initiated by an originating agency is transmitted to the originating call handler. The originating call handler transfers the call to the terminating call handler which completes the call to a terminating agency. Prior to transfer between handlers, a transfer protocol is determined. If the originating and terminating call handlers share a common native protocol, the common native protocol is selected for transfers therebetween. If the handlers do not share a common native protocol, the native protocol of the originating call handler is selected for transfers therebetween if a non-native protocol of the terminating call handler matches the native protocol of the originating call handler. Conversely, the native protocol of the terminating call handler is selected for transfers therebetween if a non-native protocol of the originating call handler matches the native protocol of the terminating call handler. If none of the aforementioned relationships are present, but the originating and terminating call handlers share a common non-native protocol, the common non-native protocol is selected for transfers therebetween. Otherwise, the call is rejected.

23 Claims, 2 Drawing Sheets

INTER-HALF CALL PROTOCOL NEGOTIATION TECHNIQUES

TECHNICAL FIELD

The invention relates generally to switching nodes for a telecommunications network and, more particularly, to a method for negotiating, within the switching node, a protocol between originating and terminating call halves.

BACKGROUND OF THE INVENTION

Within a telecommunications network, a switching system or other type of switching node couples originating and terminating stations for a call. Typically, first and second software modules, commonly referred to as an originating call handler and a terminating call handler, respectively, residing within the switching node handles exchanges of messages with a software agency respectively residing at the originating and terminating stations. Alternately, the originating and terminating stations may be terminals where the call actually originates/terminates or a trunk which couples the switching node to a next switching node. In either configuration, however, to complete a call involves a series of exchanges—from the originating agency to the originating call handler, from the originating call handler to the terminating call handler and from the terminating call handler to the terminating agency. For an agency and a handler to exchange messages therebetween, both must format messages destined for the other in accordance with a common protocol. Thus, completing a call becomes quite complex if the originating and terminating agencies use different protocols.

In recent years, several solutions to this problem have been proposed. One proposed solution has been to provide a single handler which conducts exchanges with both the originating and terminating agencies. To create such a handler, however, requires explicit knowledge of both the originating and terminating access links. While the resultant handler is able to rapidly conduct exchanges, continued maintenance thereof becomes a difficult task. For example, since the various agencies are coupled together by the single handler, a software update to one agency may require updates to all of the agencies which interact with the updated agency by way of the single handler.

Another proposed solution has been to maintain separation of the originating and terminating call handlers but to provide a generic protocol by which the two handlers may communicate. Notwithstanding the difficulties in developing a generic protocol acceptable throughout the industry, the use of a generic protocols is often typified by the need to constantly revise the protocol due to changes to the access protocols to which it provides an interface. Moreover, a generic protocol is inefficient in that it always requires conversions at both the originating and terminating ends.

SUMMARY OF THE INVENTION

The present invention, accordingly, provides a method for protocol negotiation between an originating call handler and a terminating call handler, both of which reside within a switching node of a telecommunications network, such that use of the switching node for exchanges of messages between a first station coupled to the originating call handler and a second station coupled to the terminating call handler include a minimized number of message translations within the switching node.

In one embodiment, the method minimizes message translations by determining if the originating and terminating call handlers are configured for message exchange in a common native protocol. If so, the common native protocol is selected for message exchanges between the originating call handler and the terminating call handler, thereby minimizing the number of translations to be performed within the switching node to zero.

In another embodiment, in the event that the originating and terminating call handlers do not share a common native protocol but a non-native protocol of the terminating call handler matches the native protocol of the originating call handler, the method minimizes message translations to be performed within the switching node to one translation—a translation of messages from the native protocol of the originating handler to the matching non-native protocol of the terminating call handler—to be performed within the terminating call handler.

In yet another embodiment, in the event that the originating and terminating call handlers do not share a common native protocol but a non-native protocol of the originating call handler matches the native protocol of the terminating call handler, the method minimizes message translations to be performed within the switching node to one translation—a translation of messages from the matching non-native protocol of the originating call handler to the native protocol of the terminating call handler—to be performed within the originating call handler.

In still another embodiment, in the event that neither of the originating or terminating call handlers have a non-native protocol associated therewith which matches the native protocol of the other but the originating and terminating call handlers share a common non-native protocol, the method of the present invention minimizes message translations to be performed within the switching node to two—a translation of messages from the native protocol of the originating call handler to the common non-native protocol to be performed within the originating call handler and a translation of messages from the common non-native protocol to the native protocol of the terminating call handler to be performed within the terminating call handler.

A technical advantage achieved is that overhead resulting from an excessive number of message translations within a switching node during completion of a call is reduced by negotiating a protocol, for use within the switching node, which minimizes the number of translations performed thereby.

Another technical advantage achieved is that, since software modules residing within the switching node no longer require updating due to changes in protocols other than its native and non-native protocols, the frequency and extent of software updates for the switching node is reduced.

DESCRIPTION OF A PREFERRED EMBODIMENT

Figure 1:
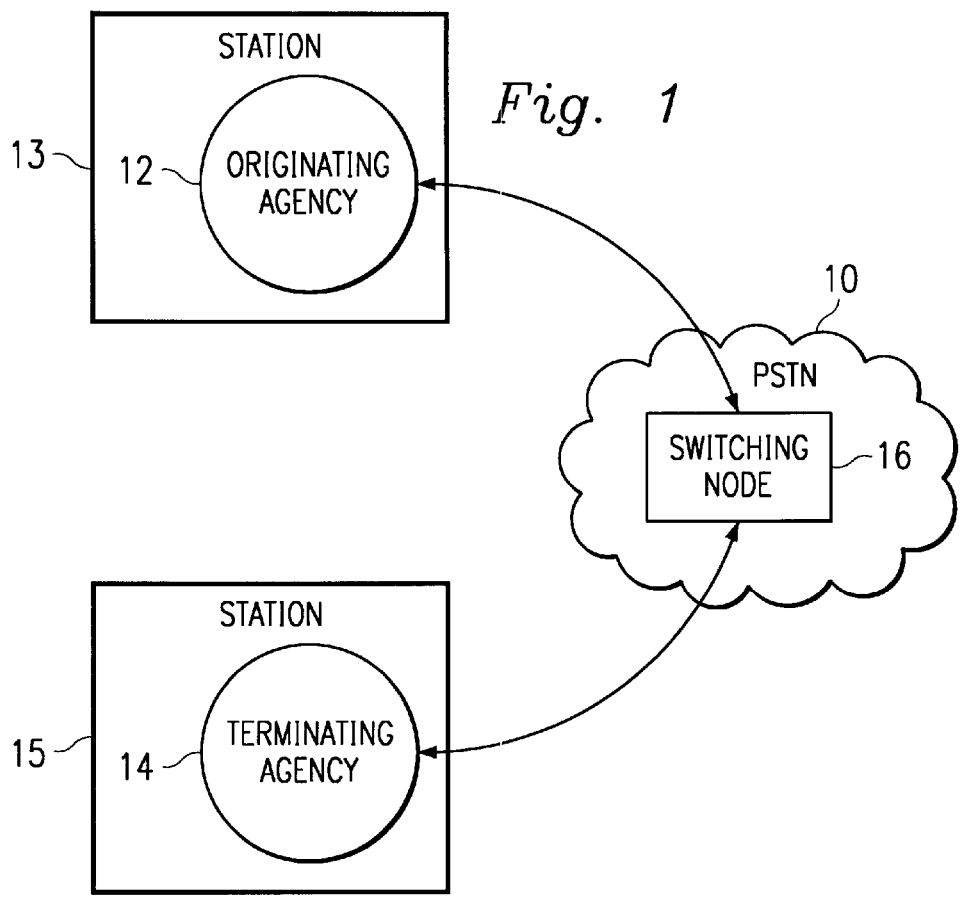
FIG. 1 is a block diagram which illustrates a telecommunications system having a switching node embodying features of the present invention.

Referring first to FIG. 1, the reference numeral 10 designates a telecommunications network. While, in the disclosed embodiment of the invention, a public switched telephone network (or "PSTN") is selected as the telecommunications network 10, it should be clearly understood that the invention is equally suitable for use with other types of telecommunication networks. The telecommunications network 10 includes a switching node 16, for example, a switching system, which directs a call initiated by an originating agency 12 residing within a first (or "originating") station 13 to a terminating agency 14 residing within a second (or "terminating") station 15. The first and second stations 13 and 15 are members of respective "circuit groups", i.e., a collection of various types of telecommunications equipment which has been designed to exchange messages with other devices using a designated protocol. For example, a trunk which is a member of an ANSI ISUP circuit group is designed to transmit and receive messages using the ANSI ISUP protocol.

In one embodiment thereof, the first and second stations 13 and 15 may be the phone terminals where the call originates and terminates, respectively. Alternately, one or both of the first and second stations 13 and 15 may trunks which couple the switching node 16 to other switching nodes. In still other alternate configurations thereof, the first and second stations 13 and 15 may be located outside the PSTN or other telecommunications network 10, as illustrated in FIG. 1, or inside the PSTN or other telecommunications network 10. For example, if the first and second stations 13 and 15 were both trunks, they would be located within the PSTN or other telecommunications network 10. Finally, it should be clearly understood that the PSTN or other telecommunications network 10 will typically include includes a wide array of other, conventional, devices which have been omitted from FIG. 1 for ease of illustration.

Figure 2:
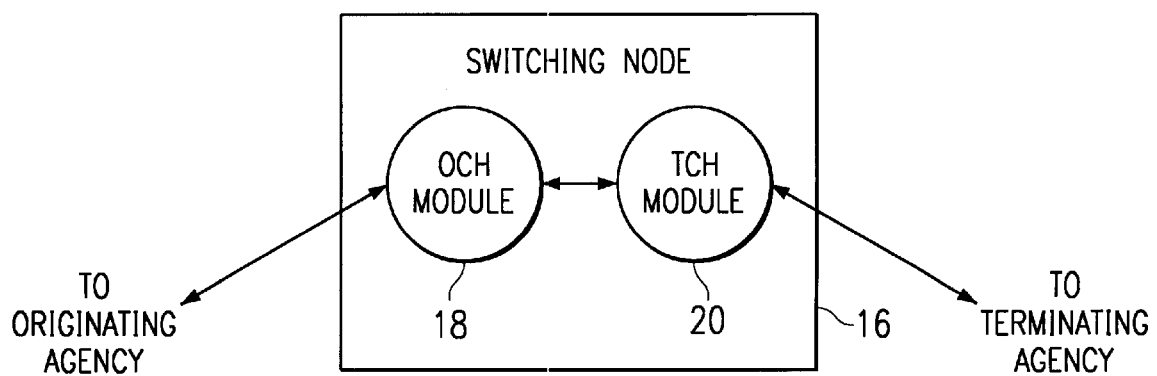
FIG. 2 is an expanded block diagram of the switching node of FIG. 1.

Referring to FIG. 2, the switching node 16 includes first and second software modules, an originating call handler (or "OCH") 18 and a terminating call handler (or "TCH") 20. The OCH 18 handles exchanges with the originating agency 12 while the TCH 20 handles exchanges with the terminating agency 14. As before, the switching node 16 has been greatly simplified for ease of illustration. Further, while, in FIG. 2, the switching node is shown as being located at a single physical location, it is fully contemplated that the switching node 16 may be configured as a distributed switching node, i.e., a switching node in which discrete hardware components are located at separate physical locations. It is further contemplated that, in one embodiment of the invention, the OCH 18 and the TCH 20 may respectively reside in hardware components provided at the separate locations of the distributed switching node.

Both the OCH 18 and the TCH 20 are configured to handle messages formatted in accordance with one or more industry standard protocols. Generally, each of the OCH 18 and the TCH 20 will be configured to have a preferred interworking (or "I/W") protocol, hereafter referred to as a "native" protocol, and a set of one or more other supported I/W protocols, hereafter referred to as "non-native" protocols. By the term "non-native protocol", it is intended to refer to any and all protocols for which the software module associated therewith is equip to translate into and out of the native protocol. Thus, residing within each of the OCH 18 and the TCH 20 are translation applications for translating messages between the native protocol and the set of one or more non-native protocols. While the OCH 18 and TCH 20 may be configured to handle a variety of protocol combinations, by way of illustration, a few possible combinations are set forth below in Table I.

TABLE I

| Example No. | Native Protocol | Non-native Protocols |
| --- | --- | --- |
| 1 | ANSI ISUP | CCITT ISUP, BISUP, ANSI PRI |
| 2 | CCITT ISUP | ANSI ISUP, BISUP, ETSI PRI |
| 3 | ANSI PRI | ETSI PRI, ANSI ISUP |
| 4 | ETSI PRI | ANSI PRI, CCITT ISUP |

For example, as illustrated in FIG. 2, the OCH module 18 may conform to example 1, while the TCH module 20 may conform to example 4. Thus, the first station 13 is part of the ANSI ISUP circuit group while the second station 15 is part of the ETSI PRI circuit group.

Figure 3:
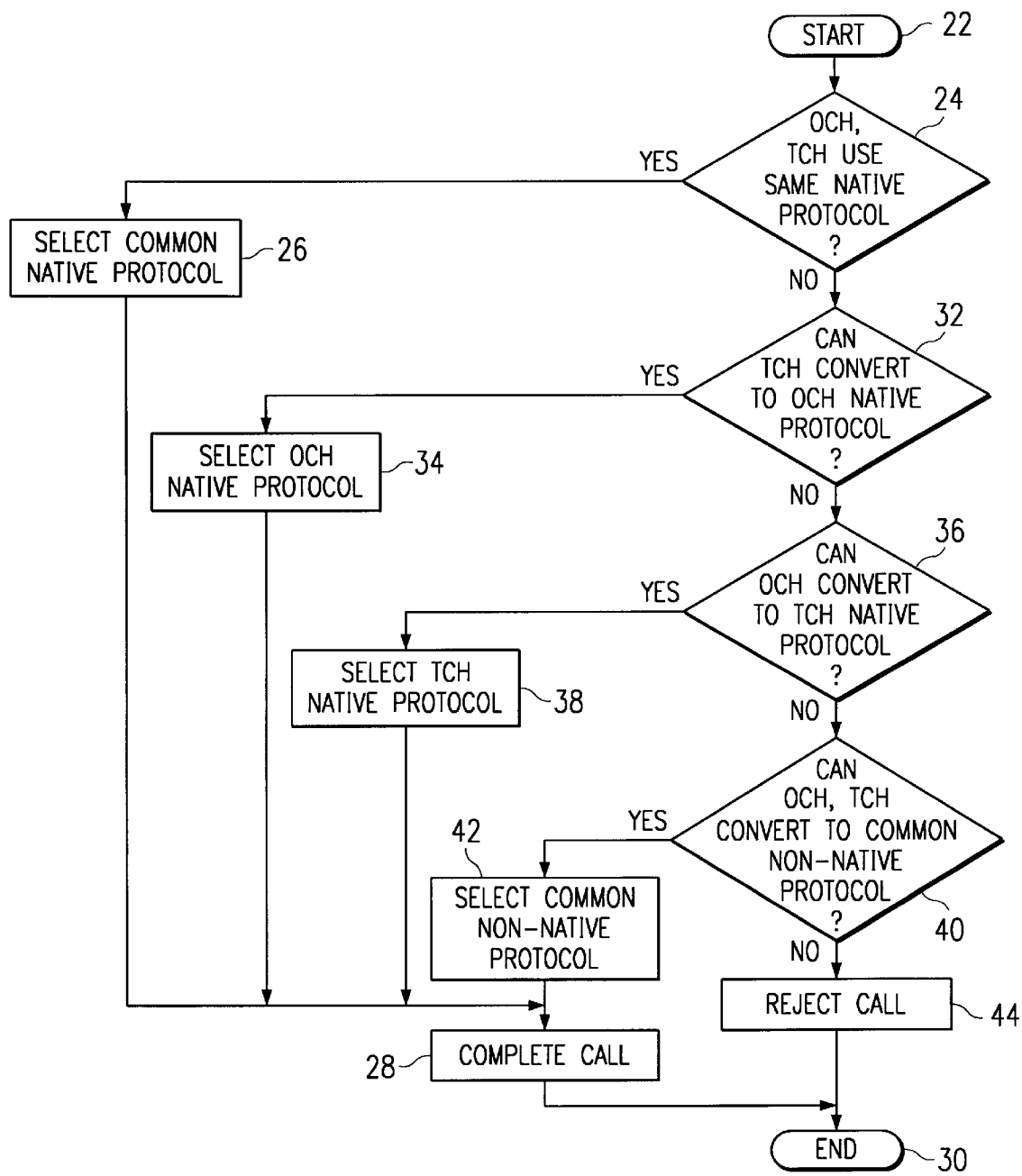
FIG. 3 is a flow chart of a dynamic protocol negotiation technique for use by the switching node of FIG. 2.

Referring next to FIG. 3, a dynamic protocol negotiation technique which enables the efficient exchange of messages between the OCH 18 and the TCH 20 by selection of a transfer protocol for exchanges of messages therebetween will now be described in greater detail. While, in the foregoing description, the transfer protocol is selected by the OCH 18, it should noted that the TCH 20 is equally suited for selection of the transfer protocol. The method commences at step 22 with the origination of a call, at the originating agency 12, having, as its destination, the terminating agency 14. The call is transferred to the OCH 18 within the switching node 16 where, in order to complete the call, it must be transferred to the TCH 20 and on to the terminating agency 14. Accordingly, at step 24, the OCH 18 determines whether the TCH 20 uses the same native protocol used by the OCH 18. It is contemplated that a variety of techniques may be used to make this determination. For example, the OCH 18 may poll the TCH 20 for a list of its native and non-native protocols. Upon receipt of the list, the OCH 18 may then compare its native protocol to the native protocol of the TCH 20. If the native protocol of the OCH 18 matches the native protocol of the TCH 20, the method proceeds to step 26 where the OCH 18 selects the common native protocol as the protocol to be used by the OCH 18 when transferring the call to the TCH 20 at step 28. The TCH 20 may then complete the call to the terminating agency 14 without translation. Upon completion of the call at step 28, the method ends at step 30.

If, however, it is determined at step 24 that the OCH 18 and the TCH 20 do not use the same native protocol, the method proceeds to step 32 where the OCH 18 determines if the TCH 20 can convert to the native protocol of the OCH 18. To do so, the OCH 18 compares its native protocol to each non-native protocol on the list of protocols provided by the TCH 20. If the native protocol of the OCH 18 matches one of the non-native protocols of the TCH 20 to which the TCH 20 can convert, the method proceeds to step 34 where the native protocol of the OCH 18 is selected as the protocol to be used by the OCH 18 when forwarding the call to the TCH 20 at step 28. The TCH 20 translates the call from the native protocol of the OCH 18 into the native protocol of the TCH 20 and completes the call to the terminating agency 14. Upon completion of the call at step 28, the method again ends at step 30.

If, however, it is determined at step 32 that the TCH 20 cannot covert to the native protocol of the OCH 18, the method proceeds to step 36 where the OCH 18 determines if it can covert to the native protocol of the TCH 20. To do so, the OCH determines if the native protocol of the TCH 20 contained on the list of protocols provided by the TCH 20 is also on the list of non-native protocols to which the OCH 18 can covert to. If the native protocol of the TCH 20 is on the list of convertible protocols for the OCH 18, the method proceeds to step 38 where the OCH 18 selects the native protocol of the TCH 20 as the protocol to be used by the OCH 18 when completing the call to the TCH 20. Thus, at step 28, the OCH 18 first translates the call from the native protocol of the OCH 18 into the native protocol of the TCH 20 and sends the translated call request to the TCH 20. The TCH 20 may then complete the call to the terminating agency without further translation.

If, however, it is determined at step 36 that the OCH 18 is unable to convert to the native protocol of the TCH 20, the method proceeds to step 40 where the OCH 18 determines if the OCH 18 and the TCH 20 can convert to a common, non-native protocol. To make this determination, the OCH 18 compares the non-native protocols on its list of convertible protocols to the non-native protocols provided on the list of protocols from the TCH 20. Again, the particular technique by which the non-native protocols of the OCH 18 are compared to the non-native protocols of the TCH 20 may vary. For example, the non-native protocols may be compared in sequence and the first matching non-native protocol selected. Specifically, a first one of the non-native protocols of the OCH 18 is compared to a first one of the non-native protocols of the TCH 20. If no match is determined, the first one of the non-native protocols of the OCH 18 is compared to a second one of the non-native protocols of the TCH 20. This continues until either a match is identified or the first one of the non-native protocols of the OCH 18 has been compared to all of the non-native protocols of the TCH 20. If no match is found, a next one of the non-native protocols of the OCH 18 is compared to each of the non-native protocols of the TCH 20 in the same manner until a match is identified or all of the non-native protocols of the OCH 18 have been compared to all of the non-native protocols of the TCH 20. Upon identification of a common non-native protocol to which both the OCH 18 and the TCH 20 can both convert, the method proceeds to step 42 where the identified common non-native protocol is selected as the protocol to be used by the OCH 18 when completing the call to the TCH 20 and on to step 28 where the OCH 18 translates the call from the native protocol of the OCH 18 into the selected common non-native protocol, transfers the translated call to the TCH 20 which, in turn, translates the call from the selected common non-native protocol into the native protocol of the TCH 20 and completes the call to the terminating agency 14. Upon completion of the call at step 28, the method again ends at step 30.

In the foregoing description, the "first match" between the non-native protocols of the OCH 18 and the non-native protocols of the TCH 20 is selected as the protocol to be used by the OCH 18 when completing the call to the TCH 20. Alternately, however, a preferred selection technique where the OCH 18 maintains a list of non-native protocols, each having a relative preference associated therewith. If multiple matches of non-native protocols are identified during the comparison process, the non-native protocol most preferred by the OCH 18 will be selected as the protocol to be used by the OCH 18 when completing the call to the TCH 20.

If, however, it is determined at step 40 that the OCH 18 and the TCH 20 cannot both convert to a common non-native protocol, the method proceeds to step 44 where the call is rejected. Having rejected the call, the method then ends at step 30.

By using the above-described technique to select a protocol to be used by the OCH 18 when transferring a call to the TCH 20, the number of translations which must be performed within the switching node 16 is minimized. To understand this advantage, several applications of the invention in variously configured telecommunication networks will now be described. In a first exemplary configuration, both the OCH 18 and the TCH 20 are configured in accordance with example 1 of Table I. Thus, both the first and second stations 13 and 15 are members of the ANSI ISUP group. Since both the OCH 18 and the TCH 20 share a common native protocol (ANSI ISUP), no translations are needed to complete the call.

In a next exemplary configuration, the OCH 18 is configured in accordance with example 1 of Table I while the TCH 20 is configured in accordance with example 3 of Table I. Here, the first station 13, where the call originates, is a member of the ANSI ISUP circuit group while the second station 15, where the call is attempting to terminate, is a member of the ANSI PRI circuit group. In this configuration, the native protocols differ. However, since the TCH 20 can convert to the native protocol of the OCH 18, the native protocol of the OCH 18 is selected for use. To complete a call in this configuration, a single translation from ANSI ISUP to ANSI PRI is required within the TCH 20.

In the final exemplary configuration, the OCH 18 is configured in accordance with example 2 of Table I while the TCH 20 is configured in accordance with example 3 of Table I. Here, the first station 13, where the call originates, is a member of the CCITT ISUP circuit group while the second station 15, where the call is attempting to terminate, is again a member of the ANSI PRI circuit group. Again, the native protocols differ. Here, however, the OCH 18 is unable to convert to the native protocol of the TCH 20 while the TCH 20 is unable to convert to the native protocol of the OCH 18. To complete a call in this configuration, two translations are required. Specifically, a message originating at the originating agency 12 must be translated from CCITT ISUP to ANSI ISUP by the OCH 18 prior to delivery to the TCH 20. Upon receipt thereof, the TCH 20 must translate the message from ANSI ISUP to ANSI PRI and then deliver the translated message to the terminating agency 14.

The foregoing examples indicate how the present invention of a protocol negotiation technique represents a substantial advancement over the prior art use of a generic protocol for exchanges between call halves. Specifically, use of a generic protocol always requires a first translation into the generic protocol by the OCH and a second translation out of the generic protocol by the TCH. In contrast, the present invention requires two translations only if the OCH and TCH lack either a common native protocol or a converter to the other's native protocol. When either of these conditions are present, the need for translations are either eliminated or reduced in number to one.

Although illustrative embodiments of the invention have been shown and described, other modifications, changes, and substitutions are intended in the foregoing disclosure. For example, protocol converters may be strung together in serial fashion, i.e., a non-native protocol may be convertible into one or more other non-native protocols. Such a modification would allow the completion of a wider variety of calls, albeit with higher overhead due to increased number of translations, that would otherwise be rejected. In another example, a software module may be provided with multiple native protocols. While the use of multiple native protocols will support a greater variety of services, again, such expanded support comes at the cost of additional overhead as the software modules must traverse multiple native protocols while seeking a common protocol. Accordingly, it is appropriate that the appended claims be construed broadly and in a manner consistent with the scope of the invention.

What is claimed is:

1. For first and second software modules, each configured for transferring messages in accordance with a native protocol, transferring messages in accordance with one or more non-native protocols and translating messages between said native protocol and said one or more non-native protocols, a method of selecting a protocol to be used during exchanges between said first software module and said second software module, comprising the steps of:

determining if said first and second software modules share a common native protocol;

if said first and second software modules share said common native protocol, selecting said common native protocol for exchanges between said first and second software modules.

2. The method of claim 1 and further comprising the steps of:

if said first and second software modules do not share said common native protocol, determining if one of said non-native protocols for said second software module matches said native protocol for said first software module;

if one of said non-native protocols for said second software module matches said native protocol for said first software module, selecting said native protocol of said first software module for exchanges between said first and second software modules.

3. For first and second software modules, each configured for transferring messages in accordance with a native protocol, transferring messages in accordance with one or more non-native protocols and translating messages between said native protocol and said one or more non-native protocols, a method of selecting a protocol to be used during exchanges between said first software module and said second software module, comprising the steps of:

determining if said first and second software modules share a common native protocol;

if said first and second software modules share said common native protocol, selecting said common native protocol for exchanges between said first and second software modules;

if none of said non-native protocols for said second software module match said native protocol for said first software module, determining if one of said non-native protocols for said first software module matches said native protocol for said second software module; and if one of said non-native protocols for said first software module matches said native protocol for said second software module, selecting said native protocol of said second software module for exchanges between said first and second software modules.

4. The method of claim 3 and further comprising the steps of:

if none of said non-native protocols of said first software module match said native protocol for said second software module, determining if said first and second software modules share a common non-native protocol; and if said first and second software modules share a common non-native protocol, selecting said common non-native protocol for exchanges between said first and second software modules.

5. For first and second software modules, each configured for transferring messages in accordance with a native protocol, transferring messages in accordance with one or more non-native protocols and translating messages between said native protocol and said one or more non-native protocols, a method of selecting a protocol to be used during exchanges between said first software module and said second software module, comprising the steps of:

determining if said first and second software modules share a common native protocol;

if said first and second software modules share said common native protocol, selecting said common native protocol for exchanges between said first and second software modules;

if said first and second software modules do not share said common native protocol, determining if one of said non-native protocols for said first software module matches said native protocol for said second software module; and if one of said non-native protocols for said first software module matches said native protocol for said second software module, selecting said native protocol of said second software module for exchanges between said first and second software modules.

6. The method of claim 5 and further comprising the steps of:

if none of said non-native protocols for said first software module match said native protocol for said second software module, determining if one of said non-native protocols for said second software module matches said native protocol for said first software module;

if one of said non-native protocols for said second software module matches said native protocol for said first software module, selecting said native protocol of said first software module for exchanges between said first and second software modules.

7. The method of claim 6 and further comprising the steps of:

if none of said non-native protocols of said second software module match said native protocol for said first software module, determining if said first and second software modules share a common non-native protocol; and if said first and second software modules share a common non-native protocol, selecting said common non-native protocol for exchanges between said first and second software modules.

8. For first and second software modules, each configured for transferring messages in accordance with a native protocol, transferring messages in accordance with one or more non-native protocols and translating messages between said native protocol and said one or more non-native protocols, a method of selecting a protocol to be used during exchanges between said first software module and said second software module, comprising the steps of:

determining if said first and second software modules share a common native protocol;

if said first and second software modules share said common native protocol, selecting said common native protocol for exchanges between said first and second software modules;

if said first and second software modules do not share said common native protocol, determining if one of said non-native protocols for said second software module matches said native protocol for said first software module;

if one of said non-native protocols for said second soft-ware module matches said native protocol for said first software module, selecting said native protocol of said first software module for exchanges between said first and second software modules;

if none of said non-native protocols for said second software module match said native protocol for said first software module, determining if one of said non-native protocols for said first software module matches said native protocol for said second software module;

if one of said non-native protocols for said first software module matches said native protocol for said second software module, selecting said native protocol of said second software module for exchanges between said first and second software modules;

if none of said non-native protocols of said first software module match said native protocol for said second software module, determining if said first and second software modules share a common non-native protocol;

if said first and second software modules share a common non-native protocol, selecting said common non-native protocol for exchanges between said first and second software modules; and if said first and second software modules do not share a common non-native protocol, rejecting exchanges between said first and second software modules.

9. For a switching node within which an originating call handler and a terminating call handler reside, a method for selecting a protocol for exchanges between said originating call handler and said terminating call handler, comprising the steps of:

determining if said originating call handler and said terminating call handler share a common native protocol;

if said originating call handler and said terminating call handler share said common native protocol, selecting said common native protocol for exchanges between said originating call handler and said terminating call handler.

10. For a switching node within which an originating call handler and a terminating call handler reside, wherein at least one of said originating call handler and said terminating call handler has multiple native protocols and the other has a single native protocol, a method for selecting a protocol for exchanges between said originating caller handler and said terminating call handler, comprising the steps of:

determining if said originating call handler and said terminating call handler share a common native protocol by comparing, in sequence, each one of said multiple native protocols to said single native protocol; and if said originating call handler and said terminating call handler share said common native protocol, selecting said common native protocol for exchanges between said originating call handler and said terminating call handler.

11. For a switching node within which an originating call handler and a terminating call handler reside, wherein both of said originating call handler and said terminating call handler has multiple native protocols, a method for selecting a protocol for exchanges between said originating caller handler and said terminating call handler, comprising the steps of:

determining if said originating call handler and said terminating call handler share a common native protocol by comparing said multiple native protocols of said originating call handler to said multiple native protocols of said terminating call handler until said common native protocol is identified; and if said originating call handler and said terminating call handler share said common native protocol, selecting said common native protocol for exchanges between said originating call handler and said terminating call handler.

12. The method of claim 9 wherein the terminating call handler further comprises a plurality of non-native protocols, the method further comprising the steps of:

if said originating call handler and said terminating call handler do not share said common native protocol, determining if one of said non-native protocols for said terminating call handler matches said native protocol for said originating call handler; and if one of said non-native protocols for said terminating call handler matches said native protocol for said originating call handler, selecting said native protocol of said originating call handler for exchanges between said originating call handler and said terminating call handler.

13. For a switching node within which an originating call handler and a terminating call handler reside, a method for selecting a protocol for exchanges between said originating caller handler and said terminating call handler, comprising the step of:

determining if said originating call handler and said terminating call handler share a common native protocol;

if said originating call handler and said terminating call handler share said common native protocol, selecting said common native protocol for exchanges between said originating call handler and said terminating call handler;

if none of said non-native protocols for said terminating call handler match said native protocol for said originating call handler, determining if one of said non-native protocols for said originating call handler matches said native protocol for said terminating call handler; and if one of said non-native protocols for said originating call handler matches said native protocol for said terminating call handler, selecting said native protocol of said terminating call handler for exchanges between said originating call handler and said terminating call handler.

14. The method of claim 13 and further comprising the step of:

if none of said non-native protocols of said originating call handler match said native protocol for said terminating call handler, determining if said originating call handler and said terminating call handler share a common non-native protocol; and if said originating call handler and said terminating call handler share a common non-native protocol, selecting said common non-native protocol for exchanges between said originating call handler and said terminating call handler.

15. The method of claim 14 and further comprising the step of:

if said originating call handler and said terminating call handler do not share a common non-native protocol, rejecting exchanges between said originating call handler and said terminating call handler.

16. The method of claim 15 and further comprising the step of:

providing, as said switching node, a switching system in which said originating call handler and said terminating call handler reside.

17. A method for optimizing operation of a switching system in which an originating call handler and a terminating call handler reside, comprising the steps of:

determining a minimized number of translations required to translate between a first exchange between an originating agency and said originating call handler in a first protocol native to said originating call handler and a second exchange between said terminating call handler and a terminating agency in a second protocol native to said terminating call handler without using a general intermediate protocol between said originating call handler and said terminating call handler; and conducting exchanges between said originating call handler and said terminating call handler, said exchanges including said minimized number of translations.

18. The method of claim 17 wherein the said minimized number of translations is determined to be zero if said native protocol for said originating call handler matches said native protocol for said terminating call handler.

19. The method of claim 18 wherein said originating call handler is configured for translating messages between said native protocol and at least one non-native protocol and wherein said minimized number of translations is determined to be one if said native protocol for said terminating call handler matches one of said at least one non-native protocols for said originating call handler.

20. A method for optimizing operation of a switching system in which an originating call handler and a terminating call handler reside, comprising the steps of:

determining a minimized number of translations required to translate between a first exchange between an originating agency and said originating call handler in a first protocol native to said originating call handler and a second exchange between said terminating call handler and a terminating agency in a second protocol native to said terminating call handler wherein said terminating call handler is configured for translating messages between said native protocol and at least one non-native protocol and wherein said minimized number of translations is determined to be one if said native protocol for said originating call handler matches one of said at least one non-native protocol for said terminating call handler; and conducting exchanges between said originating call handler and said terminating call handler, said exchanges including said minimized number of translations.

21. A switching node, comprising:

a first software module suitable for coupling to telecommunication devices which belong to a first circuit group which exchanges messages in accordance with a first native protocol, said first software module including a translation application for translating messages between said first native protocol and a first set of at least one non-native protocol; and a second software module suitable for coupling to telecommunication devices which belong to a second circuit group which exchanges messages in accordance with a second native protocol, said second software module including a translation application for translating messages between said second native protocol and a second set of at least one non-native protocol;

said first software module coupled to said second software module for exchanges of messages in accordance with a transfer protocol selectable by said first software module based upon said first native protocol, said first set of at least one non-native protocol, said second native protocol and said second set of at least one non-native protocol.

22. A switching node according to claim 21 wherein said first software module is an originating call handler.

23. A switching node according to claim 22 wherein said second software module is a terminating call handler.

* * * * *